United States Patent [19]

Heine

[11] 4,403,064
[45] Sep. 6, 1983

[54] THERMOSETTING MOLDING COMPOSITIONS, A PROCESS FOR THEIR PRODUCTION AND A PROCESS FOR THE PRODUCTION OF MOLDINGS USING THE MOLDING COMPOSITIONS

[75] Inventor: Heinrich Heine, Leverkusen, Fed. Rep. of Germany

[73] Assignee: Bayer Aktiengesellschaft, Leverkusen, Fed. Rep. of Germany

[21] Appl. No.: 166,527

[22] Filed: Jul. 7, 1980

[30] Foreign Application Priority Data

Jul. 18, 1979 [DE] Fed. Rep. of Germany ....... 2928966

[51] Int. Cl.³ .................... C08L 61/10; C08K 7/14
[52] U.S. Cl. .................... 524/494; 524/541; 524/590; 524/594
[58] Field of Search .............. 525/453; 528/85; 260/38, 37 N; 524/494, 541

[56] References Cited

U.S. PATENT DOCUMENTS

| | | | |
|---|---|---|---|
| 2,906,717 | 9/1969 | Sekmakas | 528/85 |
| 3,598,771 | 8/1971 | Davis et al. | 528/85 |
| 3,669,920 | 6/1972 | Haggis et al. | 260/37 N |
| 3,686,106 | 8/1972 | Tideswell et al. | 528/85 |
| 4,201,835 | 5/1980 | Jellinek et al. | 528/85 |
| 4,251,428 | 2/1981 | Recker et al. | 260/37 N |

FOREIGN PATENT DOCUMENTS 783564 9/1957 United Kingdom .

OTHER PUBLICATIONS

Gould, David F., *Phenolic Resins*, 1959, pp. 65, 67, 70, Reinhold Publishing Corporation, New York, N.Y.
Whitehouse, Pritchett & Barnett, *Phenolic Resins*, 1967, pp. 120–121, London, Illiffe Books, Ltd.

*Primary Examiner*—Wilbert J. Briggs, Sr.
*Assistant Examiner*—Robert E. L. Sellers
*Attorney, Agent, or Firm*—Gene Harsh; Joseph C. Gil; Lyndanne M. Whalen

[57] ABSTRACT

This invention relates to storage stable, solvent-free thermosetting polyurethane-based molding compositions which contain a fibrous reinforcing material, to a process for their production and to the production of fiber-reinforced moldings using these molding compositions.

10 Claims, No Drawings

THERMOSETTING MOLDING COMPOSITIONS, A PROCESS FOR THEIR PRODUCTION AND A PROCESS FOR THE PRODUCTION OF MOLDINGS USING THE MOLDING COMPOSITIONS

BACKGROUND OF THE INVENTION

Fiber-reinforced moldings may be produced by known processes using a number of different synthetic polymers. Glass fibers have proven to be a particularly advantageous reinforcing material. It is known that storage stable, semifinished products such as resin mats, prepregs and molding compositions can be produced from resins containing unsaturated polyesters (hereinafter referred to as "UP resins") and glass fibers. The semifinished products thus obtained may be formed by means of heated presses and subsequently hardened to form moldings of very high strength and rigidity. Unfortunately, this process involves numerous disadvantages. The vinyl group-containing monomers, for example styrene normally used as solvent for the UP resins, give rise during the radically initiated polymerization reaction to a very high density of cross-linking which, in turn, makes the molding extremely brittle and sensitive to notched impact. In addition, the presence of solvents makes processing more complicated because elaborate measures have to be taken to extract the solvent vapors, in addition to which explosion-proof processing installations have to be used.

So-called "monolayer laminates" consisting of a sheet-form glass fiber formation and epoxide resins as binder are widely used, for example in the ski industry, for the production of sandwich elements.

In addition, however, thicker laminates consisting of several layers of a glass cloth impregnated with a thermosetting binder are also required. Hitherto, "laminates" such as these have also been produced with epoxide resins as binder. With certain hardeners, generally aromatic amines or dicyanodiamide, epoxide resins form a "B-stage", i.e. an intermediate stage in which the originally liquid resin-hardener mixture has solidified but not completely hardened. In this intermediate stage, the resin is brittle, friable and may still be dissolved in a solvent (for example, acetone) at room temperature and also remelted at elevated temperature, for example 160° C. In this B-stage, the resin is partly crosslinked and still thermoplastic and, in addition, still contains free epoxide groups and amino groups. By relatively gentle heating, the remaining epoxide and amino groups are also reacted with one another so that the resin gels. In this condition ("C-stage"), the resin is insoluble in standard solvents and also infusible.

Conventional polyurethane resins had never been known to behave in this way. The two-component systems of unmasked isocyanate and polyol which are used in practice all react fully in a single stage to form the duroplastic plastic. The reason for this lies in the considerable evolution of heat during hardening in the block and in the low dimensional stability under heat (glass transition temperature) of the duroplast obtained. Another reason why no attempts were made to produce storage stable intermediate products of the type in question was because of the sensitivity of the isocyanates to water. It was assumed that, in this "B-stage", the free isocyanate groups would react with atmospheric moisture as is the case, for example, with one-component lacquers and that the material would, therefore, show inadequate storage stability in the "B-stage".

However, the production of glass-fiber-reinforced polyurethane plastics is generally known and is described, for example, in German Offenlegungsschriften Nos. 2,164,381 and 2,014,899, U.S. Pat. No. 3,678,009 and P. H. Selden's standard work, "Glasfaserverstarkte Kunststoffe (Glass-Fiber-Reinforced Plastics)", Springer-Verlag, Berlin, 1967. Thus, glass-fiber-reinforced polyurethane moldings can be produced, for example, by injection molding or reaction injection molding. However, the mechanical properties, in particular the flexural strength, of moldings produced in this way can be increased to only a limited extent because, for processing reasons, the length of the fiber material must not be any greater than about 1 to 6 mm. One particular disadvantage lies in the fact that on account of the limited fiber length the coefficient of thermal expansion of the reinforced polyurethane elastomers is still several times higher than the expansion coefficient of steel.

German Pat. No. 968,566 describes a process for the production of high molecular weight cross-linked plastics in which an intermediate product is produced initially from a polyester containing hydroxyl groups, a glycol and a less than equivalent amount of diisocyanate and is subsequently reacted with an excess of a diisocyanate containing uretdione groups to form storage stable, semifinished products. Finally, these semifinished products may be subjected to plastic forming and hardened by the effect of heat to form elastic moldings.

The polyurethane elastomers of the present invention have a predominantly linear structure and, although tough and highly elastic, lack sufficient hardness and rigidity for numerous applications. The use of fibrous reinforcing material is not mentioned in German Pat. No. 968,566. Although glass fibers having a length of more than 6 mm may, in principle, be incorporated into the above-mentioned intermediate product, the high viscosity of the intermediate product would necessitate the use of mixing rolls or kneaders, of the type normally used for processing rubber, for mixing in the fibrous material and the uretdione diisocyanate required for cross-linking. However, if the fiber material were to be incorporated in this way, such intense shear forces would be generated that the individual fibers would be reduced to fractions of their original length so that the required effects of stiffening on the one hand and reducing the coefficient of thermal expansion on the other hand could no longer be fully obtained.

Glass-fiber-reinforced polyurethane-based sheet-form structures obtained by impregnating glass fiber mats with reaction mixtures of polyisocyanates and relatively high molecular weight polyhydroxyl compounds followed by hardening under heat are described in U.S. Pat. Nos. 3,061,497 and 3,730,936 and in British Pat. Nos. 1,139,114 and 1,226,843. The main disadvantage of all these processes lies in the fact that the moisture which always adheres to the glass fibers leads to bubble formation in the product by reaction with the polyisocyanate. Because of the foam formed around the fibers in this way, these layers are unsatisfactory in terms of their strength. This is particularly noticeable under dynamic stress. Resistance to alternating stress is poor. Another disadvantage lies in the fact that hardening generally has to be carried out under relatively high pressures.

The object of the present invention is to provide new, solvent-free, storage stable molding compositions which may be hardened at elevated temperature to form bubble-free moldings characterized by high rigidity, high impact strength and high dimensional stability.

This object is achieved by the molding compositions provided by the present invention.

DESCRIPTION OF THE INVENTION

The present invention relates to solvent-free molding compositions comprising:

(A) from 10 to 20% by weight, preferably from 20 to 50% by weight, of a storage stable binder which may be hardened by heating to form a cross-linked polyurethane, and (B) from 20 to 90% by weight, preferably from 50 to 80% by weight, of an inorganic filler, wherein component (A) is a reaction product of (a) a novolak, (b) from 0 to 75% by weight and preferably from 0 to 50% by weight, based on (a)+(b) of a polyhydroxyl compound having a molecular weight of from 62 to 10,000 and preferably from 62 to 5,000, and (c) a polyisocyanate in an equivalent ratio (a+b)/c of from 0.8:1 to 1.2:1, preferably from 0.9:1 to 1.1:1 and, with particular preference, of the order of 1:1, which is tack-free at 25° C., which melts below 160° C., preferably below 140° C., and which still contains free NCO- and OH-groups and wherein component (B) is an inorganic fiber material, preferably glass fibers, having a thickness of preferably from 5 to 50μ and, more particularly, from 8 to 30μ.

The present invention also relates to a process for producing the molding compositions comprising mixing an inorganic fiber material with a reactive resin prepared by reacting (a) a novolak, (b) from 0 to 75% by weight and preferably from 0 to 50% by weight, based on (a)+(b), of a polyhydroxyl compound having a molecular weight of from 62 to 10,000 and preferably from 62 to 5,000, and (c) a polyisocyanate in an equivalent ratio of (a+b)/c of from 0.8:1 to 1.2:1, preferably from 0.9:1 to 1.1:1 and, with particular preference, of the order of 1:1, in the melt or preferably in solution in an organic solvent which is inert to the reactants and in that the reactive resin is partly hardened by heating to around 120° to 220° C. with evaporation of the solvent used, if any, so that, although tack-free at 25° C., the resin still has a melting point below 160° C. and preferably below 140° C.

Finally, the present invention relates to a process for the production of fiber-reinforced duroplastic moldings comprising hardening the molding compositions during forming by heating to temperatures of from 140° to 220° C. and preferably to temperatures of from 160° to 200° C.

The novolaks (a) used in the process according to the invention are phenol-formaldehyde condensates which have a hydroxyl functionality of at least 3, a hydroxyl group content of at least 12% by weight and generally from about 15 to 17% by weight, a softening point of preferably from about 75° to 150° C. and, with particular preference, from 75° to 100° C. and a viscosity in the form of a 30% solution in cresol/xylene (1:1) of preferably from about 100 to 1,000 and, with particular preference, from 250 to 500 mPa.s. Phenolformaldehyde condensates such as those containing phenolic hydroxyl groups may be produced, for example, in accordance with "Kunststoff-Handbuch", Volume X; "Duroplaste"  by Vieweg/Becker, Carl-Hanser-Verlag, Munich, 1968, pages 30 and 47–48; or "Methoden der organischem Chemie", Makromolekulare Stoffe, Part 2, Houben-Weyl, Volume XIV/2, pages 272 to 273, Georg Thieme Verlag, Stuttgart.

The novolaks generally correspond to the following structural formula:

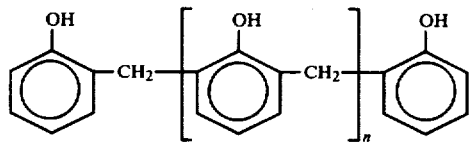

in which n is an integer of from 1 to 11.

Branched or structurally isomeric molecules, attached through the para position, are generally only present in minor quantities.

According to the invention, the polyol component (b) which may be used may be a polyester, polyester amide, polycarbonate, polyacetal, polythioether or, preferably a polyether. They should contain at least 2 and generally from 2 to 4 hydroxyl groups and have a molecular weight of from 400 to 10,000, preferably from 500 to 5,000 or a molecular weight of from 62 to 400 as chain-extending and cross-linking agents.

The polyesters containing hydroxyl groups suitable for use in accordance with the invention are, for example, reaction products of polyhydric (preferably dihydric) alcohols which may contain trihydric alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated.

Examples of these carboxylic acids and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids which may be mixed with monomeric unsaturated fatty acids such as oleic acid, terephthalic acid dimethyl ester and terephthalic acid-bis-glycol ester. Suitable polyhydric alcohols are, for example, ethylene glycol; 1,2- and 1,3-propylene glycol; 1,4- and 2,3-butylene glycol; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; 1,2,4-butane triol; trimethylol ethane; pentaerythritol; quinitol; mannitol and sorbitol; formitol; methyl glycoside; diethylene glycol; triethylene glycol; tetraethylene glycol and higher polyethylene glycols; dipropylene glycol and higher polypropylene glycols and dibutylene glycol and higher polybutylene glycols. The polyesters may contain terminal carboxyl groups. Polyesters of lactones, for example ε-caprolactone, or polyesters of hydroxycarboxylic acids, for example ω-hydroxycaproic acid, may also be used.

The polyethers containing at least 2, generally 2 to 8 and preferably 2 to 3 hydroxyl groups suitable for use in accordance with the invention are obtained, for example, by polymerizing epoxides (such as ethylene oxide, propylene oxide, butylene oxide, tetrahydrofuran, styrene oxide or epichlorohydrin). This may be done on their own, for example in the presence of Lewis catalysts (such as boron trifluoride) or by the addition of these epoxides (preferably ethylene oxide and propylene oxide, either in admixture or successively) with starter components containing reactive hydrogen atoms. Examples of starter components containing reactive hydrogen atoms are water, alcohols, ammonia or amines. Examples include ethylene glycol; 1,3-propylene glycol or 1,2-propylene glycol; trimethylol propane; glycerol; sorbitol; 4,4'-dihydroxy diphenyl propane; aniline; ethanolamine or ethylene diamine. Sucrose polyethers of the type described, for example, in German Auslegeschriften Nos. 1,176,358 and 1,064,938 and formitol- or formose-starter polyethers (German Offenlegungsschriften Nos. 2,639,083 and 2,737,951) may also be used in accordance with the invention. In many cases, it is preferred to use polyethers which predominantly contain primary hydroxyl groups (up to 90% by weight, based on all the hydroxyl groups present in the polyether). Polybutadienes containing hydroxyl groups are also suitable for use in accordance with the invention.

Among the polythioethers, reference is made in particular to the condensation products of thiodiglycol on its own and/or with other glycols, dicarboxylic acids, formaldehyde, aminocarboxylic acids or amino alcohols. Depending on the co-components, the products in question are, for example, polythio mixed ethers, polythioether esters or polythioether ester amides.

Suitable polyacetals are, for example, the compounds obtainable from glycols such as diethylene glycol, triethylene glycol, 4,4'-dioxethoxy diphenyl dimethyl methane, hexane diol and formaldehyde. Polyacetals suitable for use in accordance with the invention may also be obtained by polymerizing cyclic acetals such as trioxane (German Offenlegungsschrift No. 1,694,128).

Suitable polycarbonates containing hydroxyl groups can be obtained, for example, by reacting diols (such as 1,3-propane diol; 1,4-butane diol and/or 1,6-hexane diol; diethylene glycol; triethylene glycol; tetraethylene glycol or thiodiglycol) with diaryl carbonates, for example diphenyl carbonate; or phosgene (German Auslegeschriften Nos. 1,694,080; 1,915,908 and 2,221,871 and German Offenlegungsschrift No. 2,605,024).

The polyester amides and polyamides include, for example, the predominantly linear condensates obtained from polybasic saturated or unsaturated carboxylic acids, or their anhydrides, and polyhydric saturated or unsaturated amino alcohols, diamines, polyamines and mixtures thereof.

Polyhydroxyl compounds already containing urethane or urea groups and natural polyols (such as castor oil) which may be modified or carbohydrates (for example, starch) may also be used. Addition products of alkylene oxides with phenol-formaldehyde resins or even with ureaformaldehyde resins may also be used in accordance with the invention.

According to the invention, it is also possible to use polyhydroxyl compounds containing high molecular weight polyadducts and polycondensates or polymers in finely disperse or dissolved form.

Representatives of the above-mentioned compounds used in accordance with the invention are described, for example, in High Polymers, Volume XVI, "Polyurethanes, Chemistry and Technology" by Saunders-Frisch, Interscience Publishers, New York/London, Volume I, 1962, pages 32 to 42 and pages 44 to 54 and Volume II, 1964, pages 5–6 and 198–199 and in Kunststoff-Handbuch, Volume VII, Vieweg-Hochtlen, Carl-Hanser-Verlag, Munich, 1966, for example on pages 45 to 71. It is, of course, possible to use mixtures of the above-mentioned compounds, for example mixtures of polyethers and polyesters.

As already mentioned, component (b) is preferably formed by polyether polyols which do not contain any tertiary nitrogen atoms.

Examples of low molecular weight polyols include ethylene glycol; 1,2- and 1,3-propylene glycol; 1,4- and 2,3-butylene glycol; 1,5-pentane diol; 1,6-hexane diol; 1,8-octane diol; neopentyl glycol; 1,4-bis-hydroxymethylcyclohexane; 2-methyl-1,3-propane diol; dibromobutene diol (U.S. Pat. No. 3,723,392); glycerol; trimethylol propane; 1,2,6-hexane triol; trimethylol ethane; pentaerythritol; quinitol; mannitol and sorbitol; castor oil; diethylene glycol; triethylene glycol; tetraethylene glycol; higher polyethylene glycols having a molecular weight of up to 400; dipropylene glycol; higher polypropylene glycols having a molecular weight of up to 400; dibutylene glycol; higher polybutylene glycols having a molecular weight of up to 400; 4,4'-dihydroxy diphenyl propane dihydroxy methyl hydroquinone; N-methyl diethanolamine and triethanolamine.

Other low molecular weight polyols suitable for the purposes of the invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084; 2,714,084; 2,714,104; 2,721,186; 2,738,154 and 2,738,512). In order to obtain plastics with improved fire resistance, these formoses are advantageously used in combination with aminoplastformers and/or phosphites (German Offenlegungschriften Nos. 2,738,513 and 2,738,532). Solutions of polyisocyanate polyaddition products, particularly solutions of polyurethane ureas containing ionic groups and/or solutions of polyhydrazodicarbonamides, in low molecular weight polyhydric alcohols may also be used as polyol component in accordance with the invention (German Offenlegungsschrift No. 2,638,759).

According to the invention, suitable starting components (c) are the aliphatic, cycloaliphatic, araliphatic and preferably aromatic polyisocyanates. Examples include 1,4-tetramethylene diisocyanate; 1,6-hexamethylene diisocyanate; 1,12-dodecane diisocyanate; cyclohexane-1,3- and -1,4-diisocyanate and mixtures of these isomers; 1-isocyanato-3,3,5-trimethyl-5-isocyanatomethyl cyclohexane; 1,3- and 1,4-phenylene diisocyanate; 2,4- and 2,6-tolylene diisocyanate and mixtures of these isomers; 2,4- and 2,6-hexahydrotolylene diisocyanate and mixtures of these isomers; diphenyl methane-4,4'-diisocyanate; diphenyl methane-2,4'-diisocyanate; triphenyl methane-4,4',4''-triisocyanate; and, preferably, commercial polyphenyl-polymethylenepolyisocyanate mixtures of the type obtained by condensing aniline with formaldehyde followed by phosgenation. Other suitable starting components (c) are the isocyanates containing allophanate or biuret groups of the type obtained by reacting polyols and water or polyamines with an excess of the above-mentioned polyisocyanates. Reaction products of the above-described polyhydroxyl compounds and excess quantities of polyisocyanate (so-called NCO-prepolymers) may also be used as isocyanate component in the process according to the invention. The polyols used in the production of modified polyisocyanates such as these may be classed as component (b).

It is, of course, also possible to use mixtures of the above-mentioned polyisocyanates.

Suitable solvents are any of the usual solvents which do not react with isocyanates and which boil at temperatures below 150° C., preferably below 115° C. and with particular preference below 85° C. Examples include aliphatic and aromatic hydrocarbons which may be halogen substituted, ketones, ethers and esters. Alcohols are unsuitable because of their reactivity towards isocyanates. It is particularly preferred to use ketones such as acetone and methyl ethyl ketone. Other suitable solvents are toluene, ethyl acetate, diisopropyl ether, ethylene glycol, monomethyl ether acetate and ligroin.

Suitable reinforcing materials are glass fibers differing both in regard to their diameter and also in regard to the form in which they are processed. Examples include glass fiber rovings, glass fiber mats, glass fiber fleeces, glass fiber cloths with the same or different amount of glass in the warp and weft direction and glass fiber nonwovens. Except for the rivings, the glass fibers may be in the form of endless fibers or staple fibers. Other inorganic reinforcing fibers such as, for example, asbestos, clay, other mineral fibers, carbon fibers, boron fibers, $Al_2O_3$-fibers, whiskers and metal fibers may also be used in accordance with the invention.

According to the invention, it is preferred to use materials of glass fibers having a diameter of preferably from 5 to 50μ which are treated in known manner with sizes which provide the fibers with an affinity for polyurethanes as described, for example, in German Auslegeschriften Nos. 2,426,657 and 2,426,654.

Other inorganic fillers may, of course, be additionally used.

To produce the molding compositions according to the invention, the polyol component, which is a mixture of (a) and (b), is mixed either in the melt or preferably in the form of a 30 to 90%, preferably 50 to 80% by weight, solution with the polyisocyanate (c). The reactive resin thus obtained is preferably introduced into the impregnating tank of an impregnating installation through which the fiber material, for example a web-form glass cloth having a weight per unit area of from 40 to 500 g/m², is subsequently drawn. In the impregnating machine, the solvent is evaporated off at temperatures of from about 60° to 220° C., optionally with a temperature gradient within the machine and, at the same time, a preliminary reaction is carried out between the novolak, optionally more polyol and the isocyanate. After cooling to room temperature, the prepreg (preimpregnating material) thus obtained is hard and tack-free. On reheating, the resin briefly melts again and then gels. The prepregs may be stored for a few weeks (4 to 6 weeks) in air and for a few months in the absence of air, for example in aluminum containers (previous limit ≧3 months).

It is possible by carrying out a simple test to determine the period of time after which the required B-stage of the reactive resin has formed. Samples of the reactive resin are taken after different periods of heat treatment and cooled to room temperature. The B-stage is reached when the sample is no longer tacky or opaque but instead remains glass-clear on cooling.

The end of the B-stage is reached when the softening point of the sample exceeds 160° C.

In the B-stage, the reactive resin contains both free NCO-groups and OH-groups. The B-stage is characterized by a partial conversion of the polyaddition reaction, preferably from about 20 to 70% conversion and, more particularly, from 25 to 50%. The degree of conversion depends on the functionality of the starting components (a) to (c). The higher the functionality of the novolak and the polyisocyanate, the earlier the B-stage is reached.

The use of solvents not only affords the advantage of easier processing and a longer pot life of the reactive resin but also safely prevents any bubble formation in the molding composition.

It had not been expected from previous experience that a composite material of glass cloth and polyurethane could be produced free from bubbles. As mentioned above, the isocyanates react with the water adhering to the glass fiber, resulting in a foam formation which cannot be avoided even where standard water-absorbing additives are used because, under the processing conditions, the isocyanate reacts more quickly with the water than with the polyol and the water-absorbing agent cannot become sufficiently active in the short reaction time.

It may be regarded as surprising that this difficulty can be avoided by using solvents of relatively low boiling point. This is because solvents such as these are generally not able to dissolve the fully reacted polyurethane resin. The expert, thus, had to assume that, similar to the technical teaching of German Auslegeschrift No. 1,694,180 (U.S. Pat. No. 3,582,396), microporous laminates rather than compact, bubble-free moldings would be obtained in the process according to the invention.

Duroplastic, fiber-reinforced moldings may be produced from the molding compositions according to the invention which, as explained above, are in the storage stable B-stage, by heating to temperatures of from about 140° to 220° C. preferably to temperatures of from 160° to 200° C., in molds, most preferably under a pressure of from about 2 to 40 bar. The resin in the B-stage briefly melts, gels and finally solidifies. In general, sheet-form prepregs having a layer thickness of from about 0.05 to 1 mm are produced, after which layers thereof are placed one on top of the other until the required thickness of the molding is reached and finally the multilayer laminate is molded.

It is, of course, also possible in accordance with the invention to produce the duroplastic molding from the starting components in a single step rather than isolating the B-stage beforehand.

It may be regarded as surprising that storage stable compositions can be produced and the hardening reaction terminated by cooling the reaction mixture of components (a) to (c), although in practice the expert is recommended to process polyurethane resin precisely at low temperatures. It is also surprising that this initial ripening step is sufficient to eliminate the adverse effect of the water so that subsequently the end product is also bubble-free. However, it is important for the solvent to be evaporated before cooling. In this way, no solvent residues which could subsequently form bubbles are present during the pressing of several layers.

With the "ripening step" or "preripening" step is meant the process transforming the originally fluid or highly viscous, polyurethane forming mixture (polyol, polyisocyanate and solvent) into the solid, yet meltable "B-stage".

Despite the presence in them of free NCO-groups, the compositions according to the invention are also extremely stable under the effect of atmospheric moisture. The possibility of processing storable intermediate products such as these is particularly advantageous to the processor because the prepregs may be prefabricated and stored. The user does not have to come into direct contact with the resin nor are any vapors or gases given off during processing. Accordingly, the prepreg is kind to the environment.

The duroplastic glass-fiber-reinforced polyurethane molding produced in accordance with the invention has inter alia the practical advantages of high dynamic and static strength values. The reason for this lies in the direct surface transmission of the forces between the plastic and the glass fibers. In addition, where two-component adhesives, for example based on epoxide or polyurethane resins, are used, the bond strengths of layers such as those of glass-fiber-reinforced polyurethane resin are excellent so that, once bonded, a layer cannot be separated from its substrate without destruction.

The compositions according to the invention are suitable for the production of a variety of different fiber-reinforced moldings and sandwich elements, for example in the automotive field (for housings, doors and superstructures), in the sports goods field (for skis, surf-boards or water skis) and for other utility articles which are subjected to frequent dynamic stressing.

In addition, the compositions according to the invention may be used in the production of laminates for the electrical industry. These laminates may be further processed into keys, spring elements, insulating plates or screws.

By applying one or more copper foils to the laminate and partly etching the copper, it is possible to produce circuit boards of the type required, for example, for radio and television sets and in the computer industry.

The invention is illustrated by the following Examples in which the quantities quoted represent parts by weight and percentages by weight unless otherwise indicated.

A novolak produced in acid medium (oxalic acid) from phenol and formaldehyde in a molar ratio of 1 mol of phenol to 0.85 mol of formaldehyde was used in the Examples.

The novolak is a mixture of polynuclear compounds of the diphenylmethane series which may be characterized by the following values:

| Softening point: | 75 to 90° C. |
| --- | --- |
| Viscosity of a 30% solution in cresol/xylene: | approximately 350 mPa.s |
| Density: | approximately 1.3 g/m$^3$ |
| Hydroxyl number: | 530 to 540 |

After dissolution in a solvent, the novolak may be mixed with polyisocyanates to form homogeneous solutions which show excellent storage stability ranging from several hours to days (according to concentration) and which may, therefore, be excellently processed.

EXAMPLES

EXAMPLE 1

100 parts of the novolak are dissolved in 95 parts of acetone. 123 parts of a mixture of 40% of 4,4'- and 60% of 2,4'-diisocyanato-diphenylmethane are added to the resulting solution. The mixture thus produced may be stored for about 60 hours at room temperature.

The mixture is introduced into the impregnating tank of an impregnating installation of the type normally used for the production of epoxide resin prepregs. A glass cloth having a weight per unit area of 200 g/m$^2$ and substantially the same quantity of glass fibers in the warp and weft directions (the size having been removed by a heat treatment) is then drawn through the impregnating solution in an open impregnating tank, and after passage of a guide roll within the impregnating solution the impregnated glass cloth is led out of the tank in the upright position. In the further impregnating installation solvent is evaporated off from the impregnated glass cloth and, at the same time, the polyurethane resin system preripened over a period of 3 minutes at temperatures of from 60° C. (lower part) and 160° C. (upper part). A dry, tack-free impregnated web-form glass cloth containing approximately 30% by weight of binder is formed. Its impregnating resin may be reliquefied under heat and pressure (the binder still contains approximately 10% of NCO-groups).

24 layers of these prepregs (measuring 300×300 mm) are placed one on top of the other and pressed in a press for 2 hours at 180° C. under a pressure of 40 kp/cm$^2$ to form a 4 mm thick plate which has the following strength values:

| Tensile strength | (DIN 53 455) MPa | | 406 |
| --- | --- | --- | --- |
| Breaking elongation | (DIN 53 455) % | | 1.7 |
| Flexural strength | (DIN 53 452) MPa | 25° C. | 516 |
| | | 60° C. | 478 |
| | | 100° C. | 446 |
| | | 140° C. | 442 |
| | | 180° C. | 345 |
| | | 220° C. | 47 |

EXAMPLE 2

A 70% solution in acetone of a mixture of the novolak and a commercial polyisocyanate (NCO-content: 31.7%; consisting mainly of 4,4'-diisocyanato-diphenylmethane (about 40% by weight), 2,4'-diisocyanato-diphenyl-methane (about 15% by weight) and about 45% by weight of 3-and higher-nuclear-polyisocyanates of the diphenyl-methane-series and a viscosity of about 150 mPa.s at 25° C.) is reacted (NCO-/OH-equivalent ratio: 1:1) in the same way as in Example 1. The solution remains stable for about 24 hours. As in Example 1, a glass cloth is drawn through this reactive solution, impregnated and subsequently dried. For a residence time of 3 minutes in the drying tunnel, it is necessary in this case because of the higher reactivity of the polyisocyanate to reduce the drying temperature in the upper part of the installation by 10° C. (i.e. to 60° to 150° C.) in relation to Example 1 in order to obtain an optimally processable prepreg. The resin composition contains approximately 12% of free NCO-groups.

24 layers of the prepregs are pressed in the same way as described above. The plate obtained shows the following strength values:

| Tensile strength: | MPa | 375 |
| --- | --- | --- |
| Flexural strength: | MPa | 515 |
| Compressive strength: | MPa | 402 |
| Martens value: | °C. | 240 |
| Glass content: | % | 66 |

EXAMPLE 3

A glass fiber roving strand (2,400 tex = 2,400 g per 1,000 m) treated with a sizing agent according to Example 1 of German Auslegeschrift No. 2,426,657 is drawn in through the reactive resin solution described in Example 2, freed from solvent in a drying tower at 160° C. and, at the same time, converted into the B-stage. After cooling to room temperature, a solid, tack-free, strand-like structure is obtained and is subsequently cut into rods approximately 10 mm long. This molding composition is introduced into a chromium-plated steel mold closed on all sides and pressed under a pressure of 40 kp/cm$^2$ at 180° C. to form a 4 mm thick plate. Under these conditions, the resin matrix still containing approximately 10% of NCO-groups melts once again, the glass fibers float and a homogeneous, transparent plate having the following values is formed:

| Flexural strength: | MPa | 140 |
| --- | --- | --- |
| Impact strength: | kJm$^3$ | 15 |
| Ball indentation hardness: | MPa | 400 |
| Martens value: | °C. | 234 |
| Glass content: | % | 60. |

What is claimed is:

1. Solvent-free molding compositions comprising:
   (A) from 10 to 80% by weight of a storage stable binder which may be hardened by heating to form a cross-linked polyurethane, and
   (B) from 20 to 90% by weight of an inorganic filler, wherein component (A) is a reaction product of
   (a) a novolak,
   (b) from 0 to 75% by weight, based on (a)+(b), of a polyhydroxyl compound other than a novolak having a molecular weight of from 62 to 10,000, and
   (c) polyisocyanate in an equivalent ratio of (a+b)/c of from 0.8:1 to 1.2:1,
   which is tack-free at 25° C., melts below 160° C. and still contains free NCO- and OH-groups, and wherein component (B) is an inorganic fiber material.

2. The molding composition of claim 1 wherein component (A) is a reaction product, still containing free NCO- and OH-groups, of
   (a) a novolak,
   (b) from 0 to 50% by weight, based on (a)+(b), of a polhydroxyl compound other than a novolak having a molecular weight of from 62 to 5,000, and
   (c) a polyisocyanate in a equivalent ratio (a+b)/c of from 0.9:1 to 1.1:1.

3. The molding composition of claim 1 or 2 wherein the degree of conversion of the starting compounds (a) to (c) of component (A) amounts to between 20 and 70%.

4. The molding composition of claim 1 or 2 wherein the degree of conversion amounts to between 25 and 50%.

5. The molding composition of claim 1 wherein component (B) is a sheet-form, band-form or strand-form material of glass fibers having a thickness of from 5 to 50μ.

6. A process for producing solvent-free molding compositions comprising mixing inorganic fiber material with a reactive resin comprising:
   (a) a novolak,
   (b) from 0 to 75% by weight, based on (a)+(b), of a polyhydroxyl compound other than a novolak having a molecular weight of from 62 to 10,000, and
   (c) a polyisocyanate in an equivalent ratio of (a+b)/c of from 0.8:1 to 1.2:1,
   in the melt or in solution in an inert organic solvent, and the reactive resin is partly hardened by heating to a temperature of from 120° to 220° C. with evaporation of the solvent used, if any, so that, although tack-free at 25° C., the resin still has a melting point below 160° C.

7. The process of claim 6 wherein said equivalent ratio of (a+b)/c is from 0.9:1 to 1.1:1.

8. The process of claim 6 wherein components (a)+(b) are used in the form of a 30 to 90% by weight solution in an organic solvent.

9. The process of claim 6 wherein the reaction of components (a) to (c) is carried out up to a conversion of from 20 to 70%.

10. A process for the production of fiber-reinforced moldings, comprising: hardening the following composition by heating to temperatures of from 140° to 220° C.: a solvent-free molding composition comprising:
    (A) from 10 to 80% by weight of a storage stable binder which may be hardened by heating to form a cross-linked polyurethane, and
    (B) from 20 to 90% by weight of an inorganic filler, wherein component (A) is a reaction product of
    (a) a novolak,
    (b) from 0 to 75% by weight, based on (a)+(b), of a polyhydroxyl compound other than a novolak having a molecular weight of from 62 to 10,000, and
    (c) a polyisocyanate in an equivalent ratio of (a+b)/c of from 0.8:1 to 1.2:1,
    which is tack-free at 25° C., melts below 160° C. and still contains free NCO- and OH-groups, and wherein component (B) is an inorganic fiber material.

* * * * *